United States Patent [19]
Shaffer et al.

[11] Patent Number: 5,941,788
[45] Date of Patent: *Aug. 24, 1999

[54] VEHICLE DRIVETRAIN DIFFERENTIAL

[75] Inventors: Theodore E. Shaffer; Murat N. Okcuoglu, both of Santa Barbara, Calif.

[73] Assignee: Asha Corporation, Santa Barbara, Calif.

[ * ] Notice: This patent is subject to a terminal disclaimer.

[21] Appl. No.: 08/882,363

[22] Filed: Jun. 25, 1997

Related U.S. Application Data

[63] Continuation of application No. 08/733,362, Oct. 17, 1996, Pat. No. 5,735,764, which is a continuation of application No. 08/482,761, Jun. 7, 1995, Pat. No. 5,595,214, which is a continuation-in-part of application No. 08/205,900, Mar. 3, 1994, Pat. No. 5,536,215, which is a continuation-in-part of application No. 08/016,168, Feb. 10, 1993, Pat. No. 5,310,388.

[51] Int. Cl.⁶ ................................. F16H 48/26
[52] U.S. Cl. ...................... 475/88; 192/103 F
[58] Field of Search ............... 475/89, 88, 87, 475/93, 104, 106; 192/4 B, 216, 221, 221.1, 225, 103 F

[56] References Cited

U.S. PATENT DOCUMENTS

| | | |
|---|---|---|
| 1,660,588 | 1/1928 | Wishart et al. . |
| 2,004,929 | 6/1935 | Centervall . |
| 2,026,777 | 1/1936 | Dumble . |
| 2,775,141 | 12/1956 | Ronning . |
| 2,808,739 | 10/1957 | Mueller .................. 475/89 |
| 2,861,477 | 11/1958 | Mueller .................. 475/89 |

(List continued on next page.)

FOREIGN PATENT DOCUMENTS

| | | |
|---|---|---|
| 1217791 | 12/1959 | France . |
| 1079479 | 3/1984 | U.S.S.R. . |
| 2038429 | 11/1982 | United Kingdom . |

*Primary Examiner*—Rodney H. Bonck
*Attorney, Agent, or Firm*—Brooks & Kushman P.C.

[57] ABSTRACT

A vehicle drivetrain differential (22) driven by a rotary drive member (24) rotatively drives a pair of rotary members (26, 28) and includes a housing (30) for containing hydraulic fluid and in which a hydraulic coupling (32) is received. A casing (34) of the hydraulic coupling has a ring gear (44) rotatively driven by the rotary drive member (24). A planetary gear set (36) of the bevel gear type is located within the casing (34) and includes a pair of bevel gears (124, 126) having associated spline connections (128, 130) to the pair of rotary members (26, 28), and the planetary gear set also includes planet gears 132 that revolve with the casing 34 and are meshed with both bevel gears to provide a differential gear action. A fluid inlet 58 and an outlet port 78 of the casing are provided with a gerotor type pump (48) provides pumping of hydraulic fluid into and out of the casing. A control valve (80) opens and closes the outlet port (78) in response to the relative rotation between the pair of rotary members to control operation of the pump as a brake in coupling the pair of rotary members (26, 28) to each other.

1 Claim, 3 Drawing Sheets

U.S. PATENT DOCUMENTS

| | | |
|---|---|---|
| 2,899,981 | 8/1959 | Binks . |
| 2,913,928 | 11/1959 | Double . |
| 2,922,319 | 1/1960 | Burner . |
| 3,229,550 | 1/1966 | Nickell . |
| 3,230,795 | 1/1966 | Mueller . |
| 3,251,244 | 5/1966 | Nickell . |
| 3,350,961 | 11/1967 | Dodge . |
| 3,361,008 | 1/1968 | Fallon . |
| 3,393,582 | 7/1968 | Mueller . |
| 3,393,583 | 7/1968 | Mueller ........................... 475/89 |
| 3,407,599 | 10/1968 | Ulbricht . |
| 3,490,312 | 1/1970 | Seitz et al. . |
| 3,616,882 | 11/1971 | White ........................... 192/4 B X |
| 3,686,976 | 8/1972 | Philippi . |
| 3,724,289 | 4/1973 | Kennicutt . |
| 3,748,928 | 7/1973 | Shiber . |
| 3,752,280 | 8/1973 | Cheek . |
| 3,835,730 | 9/1974 | Pemberton . |
| 3,894,446 | 7/1975 | Snoy et al. . |
| 3,923,113 | 12/1975 | Pagdin . |
| 3,987,689 | 10/1976 | Engle . |
| 4,012,968 | 3/1977 | Kelbel . |
| 4,031,917 | 6/1977 | De John et al. . |
| 4,041,804 | 8/1977 | Clark . |
| 4,091,901 | 5/1978 | F'Geppert . |
| 4,253,491 | 3/1981 | Worthen et al. . |
| 4,258,588 | 3/1981 | Yum . |
| 4,263,824 | 4/1981 | Mueller . |
| 4,272,993 | 6/1981 | Kopich . |
| 4,388,196 | 6/1983 | Lucia . |
| 4,445,400 | 5/1984 | Sullivan et al. . |
| 4,493,387 | 1/1985 | Lake et al. . |
| 4,519,755 | 5/1985 | Hanson ........................... 418/9 |
| 4,548,096 | 10/1985 | Giocastro et al. . |
| 4,601,359 | 7/1986 | Weismann et al. . |
| 4,606,428 | 8/1986 | Giere . |
| 4,630,505 | 12/1986 | Williamson . |
| 4,644,822 | 2/1987 | Batchelor . |
| 4,650,028 | 3/1987 | Batchelor . |
| 4,679,463 | 7/1987 | Ozaki et al. . |
| 4,714,129 | 12/1987 | Mueller . |
| 4,719,998 | 1/1988 | Hiramatsu et al. . |
| 4,727,966 | 3/1988 | Hiramatsu et al. . |
| 4,730,514 | 3/1988 | Shikata et al. . |
| 4,732,052 | 3/1988 | Dewald . |
| 4,821,604 | 4/1989 | Asano . |
| 4,836,760 | 6/1989 | MacLeod ........................... 418/166 |
| 4,867,012 | 9/1989 | McGarraugh . |
| 4,876,921 | 10/1989 | Yasui et al. . |
| 4,884,470 | 12/1989 | Onoue . |
| 4,905,808 | 3/1990 | Tomita et al. . |
| 4,909,371 | 3/1990 | Okamoto et al. . |
| 4,919,006 | 4/1990 | Willett et al. . |
| 4,957,473 | 9/1990 | Takemura et al. . |
| 4,960,011 | 10/1990 | Asano . |
| 4,966,268 | 10/1990 | Asano et al. . |
| 4,974,471 | 12/1990 | McGarraugh . |
| 5,005,131 | 4/1991 | Imaseki et al. . |
| 5,087,228 | 2/1992 | Johansson . |
| 5,189,930 | 3/1993 | Kameda . |
| 5,194,053 | 3/1993 | Sano et al. ........................... 475/106 X |
| 5,213,125 | 5/1993 | Leu . |
| 5,310,388 | 5/1994 | Okcuoglue et al. . |
| 5,320,586 | 6/1994 | Bater, Jr. . |
| 5,536,215 | 7/1996 | Shaffer et al. . |

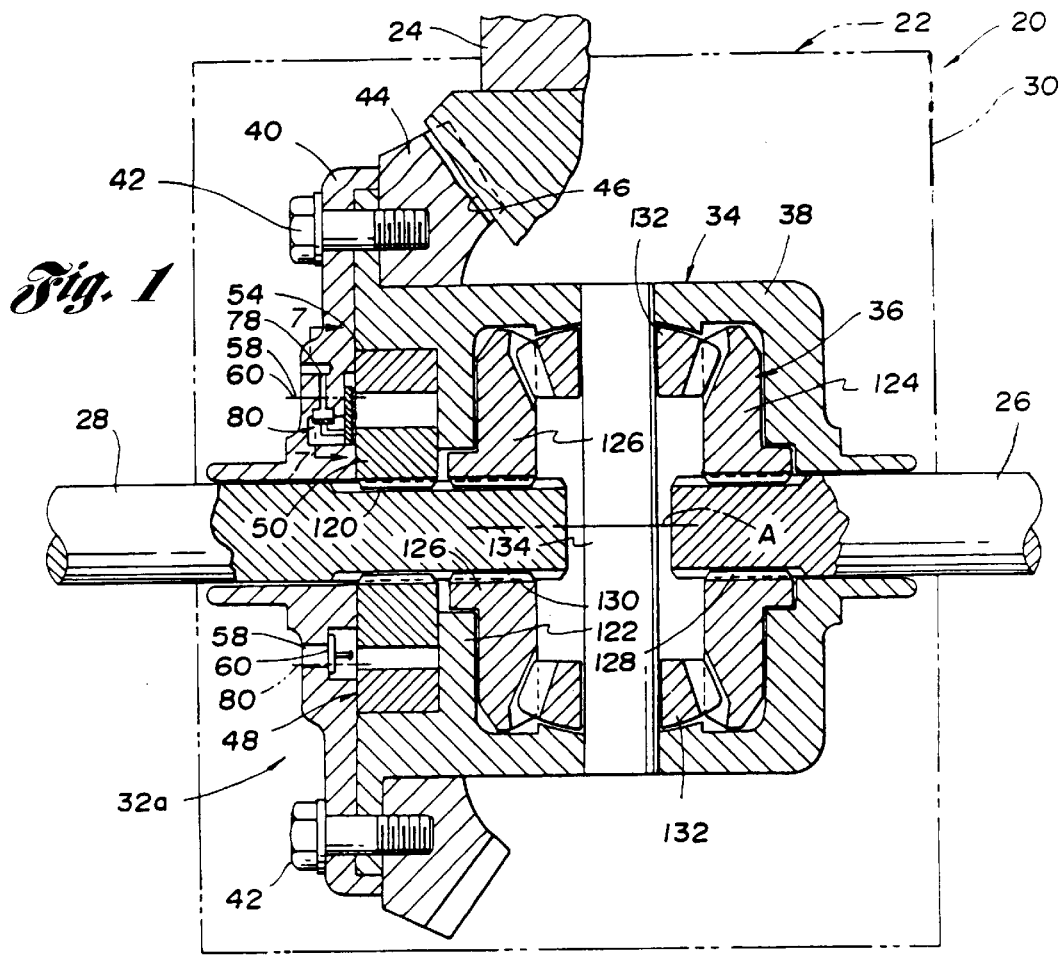

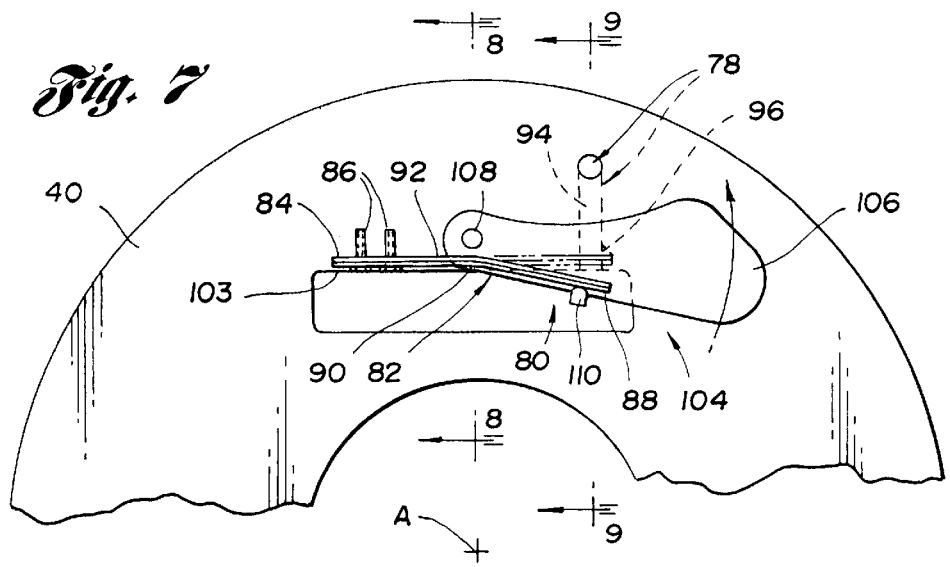
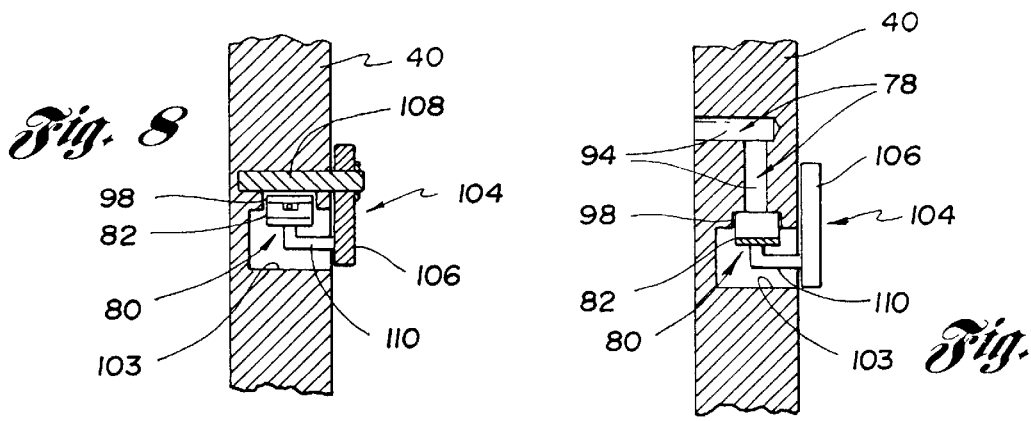
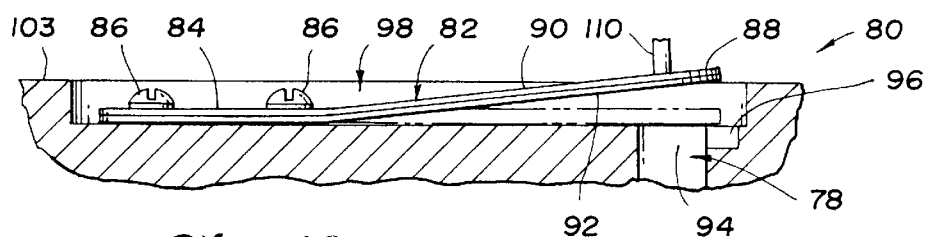
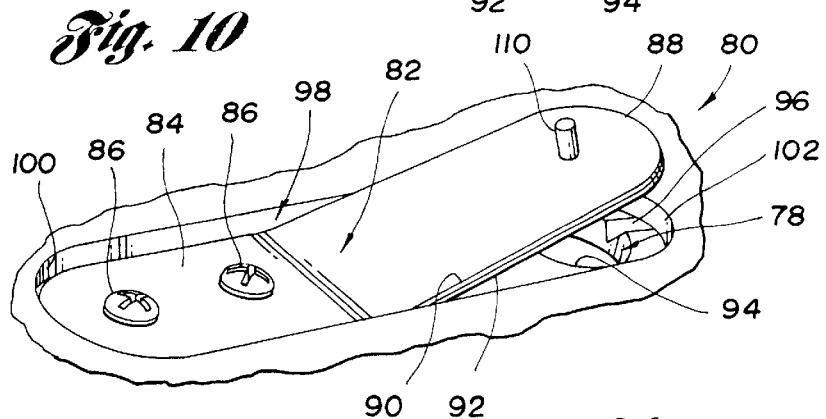

5,941,788

VEHICLE DRIVETRAIN DIFFERENTIAL

CROSS REFERENCE TO RELATED APPLICATIONS

This application is a continuation of prior application Ser. No. 08/733,362, now U.S. Pat. No. 5,735,764, filed on Oct. 17, 1996 in the names of Murat N. Okcuoglu and Theodore E. Shaffer as a continuation of prior application Ser. No. 08/482,761, now U.S. Pat. No. 5,595,214, filed on Jun. 7, 1995 in the names of Murat N. Okcuoglu and Theodore E. Shaffer as a continuation-in-part of application Ser. No. 08/205,900 now U.S. Pat. No. 5,536,215 filed on Mar. 3, 1994 in the names of Murat N. Okcuoglu and Theodore E. Shaffer as a continuation-in-part of prior application Ser. No. 08/016,168 filed on Feb. 10, 1993 in the name of Murat N. Okcuoglu and Theodore E. Shaffer, now U.S. Pat. No. 5,310,388.

TECHNICAL FIELD

This invention relates to a hydraulic coupling for use with a vehicle drivetrain within a housing thereof containing hydraulic fluid to rotatively couple a pair of rotary members about a rotational axis.

BACKGROUND ART

Hydraulic couplings have previously utilized hydraulic pumps to couple rotary members of a vehicle drivetrain. For example, U.S. Pat. No. 4,012,968 Kelbel discloses a differential mechanism wherein a hydraulic pump of the gerotor type is located radially outward from the axis of rotation of the two members and provides pumped hydraulic fluid to a clutch that controls operation of a bevel type planetary gear set to limit the differential action so as to thus have a limited slip function. U.S. Pat. 4,730,514 Shikata et al discloses another differential mechanism wherein a hydraulic pump controls operation of a bevel gear type planetary gear set that extends between two rotary members such that a limited slip function of the differential gear operation is also provided. Furthermore, U.S. Pat. Nos. 3,748,928 Shiber; 4,719,998 Hiramatsu et al; 4,719,998 Hiramatsu et al; 4,727,966 Hiramatsu et al; and 4,909,371 Okamoto et al disclose hydraulic pumps utilized within vehicle drivetrains to control actuation of a clutch that connects two rotary members of a vehicle drivetrain.

DISCLOSURE OF INVENTION

An object of the present invention is to provide an improved vehicle drivetrain differential including a housing for containing hydraulic fluid, a casing rotatively mounted within the housing and driven through a ring gear by a drive member of the drivetrain, a planetary gear set within the casing for coupling a pair of rotary members, a gerotor pump that pumps hydraulic fluid into the casing through a fluid inlet and outwardly through an outlet port upon differential rotation between the pair of rotary members, and a control valve that opens and closes the outlet port in response to relative rotation between the pair of rotary members to control the operation of the pump as a brake and coupling of the pair of rotary members to each other.

The objects, features and advantages of the present invention are readily apparent from the following detailed description of the best mode for carrying out the invention when taken in connection with the accompanying drawings.

BRIEF DESCRIPTION OF DRAWINGS

FIG. 1 is a sectional view taken through a differential having a hydraulic coupling including a control valve constructed in accordance with the present invention and operable to couple a pair of rotary members by a hydraulic pump and a bevel type planetary gear set;

FIG. 2 is a sectional view taken through the pump along the direction of line 2—2 in FIG. 1 and discloses the pump as having an impeller with six teeth meshed with an internal ring gear having seven teeth to provide a pumping action that allows the pump to function as a brake while still having relatively constant pumping pressure that facilitates actuation of the associated clutch without fluid pressure pulsation;

FIG. 7 is a longitudinal view taken along the direction of line 7—7 in FIG. 1 to illustrate the control valve which is constructed according to the invention and is associated with an outlet port through which the hydraulic fluid is pumped from the casing and whose operation controls the coupling of the rotary members to each other;

FIG. 8 is a sectional view taken along the direction of line 8—8 in FIG. 7 and further discloses a valve closure which closes the valve when the casing rotates above a predetermined speed;

FIG. 9 is a sectional view taken along the direction of line 9—9 in FIG. 7 to further illustrate the control valve and valve closure construction;

FIG. 10 is a partial sectional view that further illustrates the construction of the control valve at the outlet with a valve element thereof shown in a solid line indicated open position and a phantom line indicated closed position with respect to the outlet port; and FIG. 11 is a perspective view that further illustrates the construction of the outlet port and the valve.

BEST MODE FOR CARRYING OUT THE INVENTION

Figure 3:
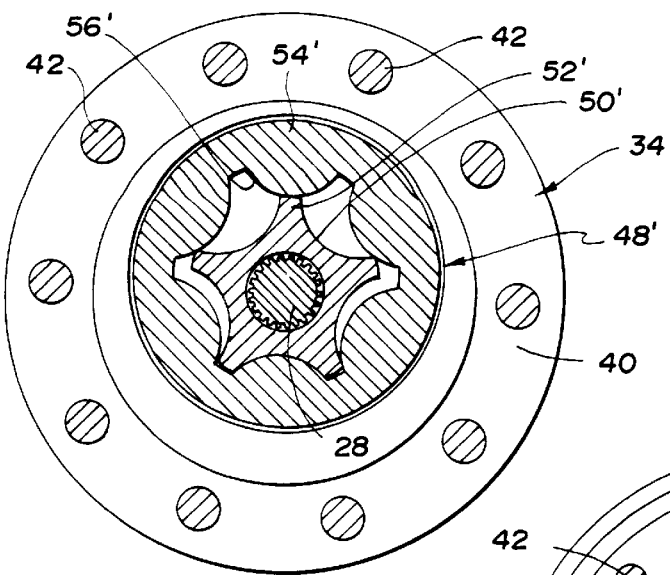
FIG. 3 is a view similar to FIG. 2 to illustrate that the pump can also have its impeller provided with five teeth and its internal ring gear provided with six teeth when a greater pumping capacity is desired.

With reference to FIG. 1 of the drawings, a partially illustrated vehicle drivetrain that is generally indicated by 20 includes a differential 22 that is rotatively driven from the vehicle engine by a rotary drive member 24 and operates to drive a pair of axial half shafts 26 and 28 that respectively embody a pair of rotary members which rotate about a rotational axis A. The differential includes a housing 30 for containing hydraulic fluid and having suitable unshown seals through which the rotary members 24, 26 and 28 project. Within the housing 30, the differential includes a hydraulic coupling 32 that operates to rotatively couple the axial half shafts 26 and 28 driven by the rotary drive member 24 as is hereinafter more fully described.

With continuing reference to FIG. 1, the hydraulic coupling 32 includes a casing 34 of a hollow construction that is rotatable within the housing about the rotational axis A and connected to one of the rotary members, which in the illustrated embodiment is the right axle half shaft 26, with the connection being provided by a planetary gear set 36 that is of the bevel gear planetary type as is hereinafter more fully described. Casing 34 as illustrated includes a cup-shaped member 38 and a cap member 40 which each have peripheral flanges secured to each other by circumferentially spaced bolts 42 that also secure a ring gear 44 of the bevel type which is rotatively driven by a bevel driving portion 46 of the drive member 24.

Figure 4:
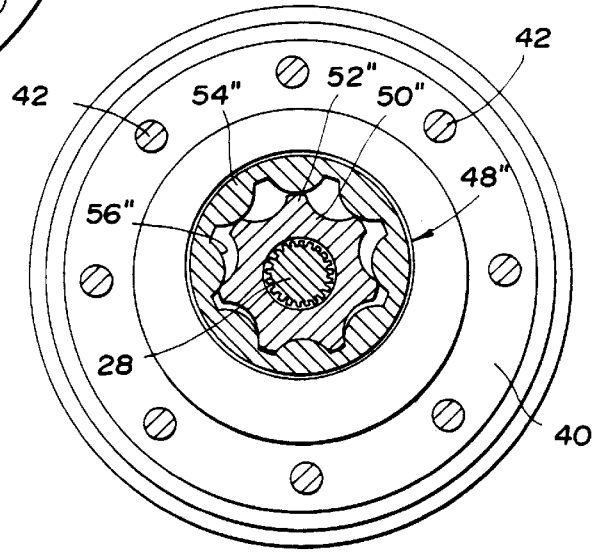
FIG. 4 is a view similar to FIGS. 2 and 3 but illustrating the impeller as having seven teeth and the internal ring gear as having eight teeth when a more constant fluid pressure is desired.

With combined reference to FIGS. 1 and 2, the hydraulic coupling 32 also includes a hydraulic pump 48 located within the casing 34 along the rotational axis A and including a pumping component embodied by an impeller 50 having external teeth 52. The hydraulic pump also includes an internal ring gear 54 mounted by the casing 34 for rotation eccentrically with respect to the toothed impeller 50 and including internal teeth 56 of a number that is one more than the impeller teeth and which are in a meshing relationship with the impeller teeth to provide a pumping action upon relative rotation between the casing and the toothed impeller. As is hereinafter more fully described, the impeller 50 most preferably has six teeth 52 and the internal ring gear 54 has seven teeth 56 which is a relationship that provides sufficient pumping capacity so that the hydraulic pump can act effectively as a brake while still having relatively constant pumping pressure without fluid pulsation that would adversely affect the hydraulic coupling provided between the rotary members. As shown in FIG. 3, it is also possible for the hydraulic pump 48' to have its impeller 50' provided with five external teeth 52' and for the ring gear 54' to have six teeth 56' meshed with the impeller teeth which is a construction that will provide a somewhat greater pumping capacity but less consistency in the fluid pressure but not so inconsistent as to interfere with effective hydraulic coupling between the rotary members. Likewise as illustrated in FIG. 4, it is also possible for the hydraulic pump 48" to have its impeller 50" provided with seven internal teeth 52" and its internal ring gear 54" to have eight teeth 56" when more consistent fluid pressure is desirable even though there is an accompanying decrease in the amount of pumped fluid. Thus, the impeller has between five and seven external teeth with six being most preferable while the internal ring gear has one more tooth than the number of impeller teeth utilized.

Figure 5:
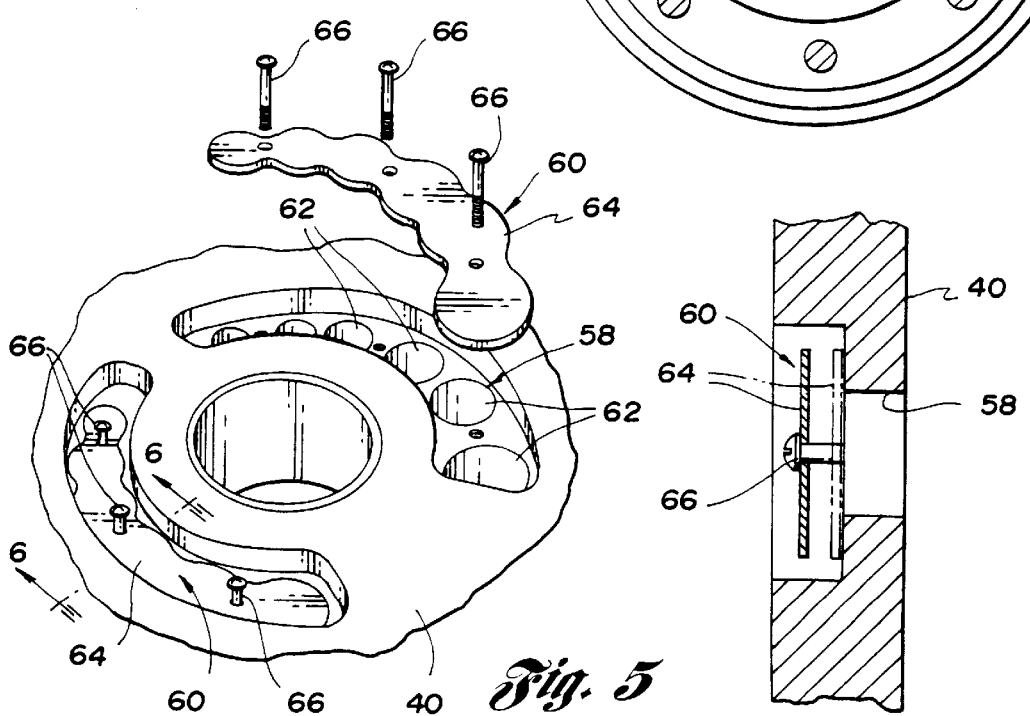
FIG. 5 is an exploded perspective view illustrating the construction of inlet valves for inlet ports through which hydraulic fluid is pumped into a casing of the coupling.
Figure 6:
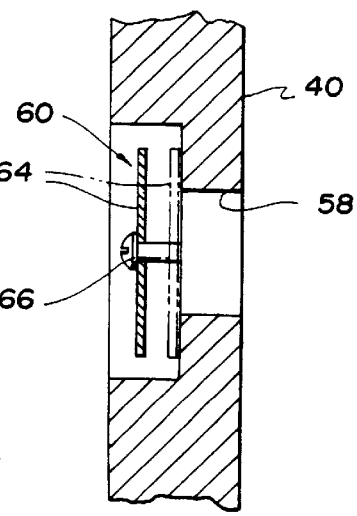
FIG. 6 is a sectional view taken along the direction of line 6—6 in FIG. 5 to illustrate the opening and closing valve operation.

With combined reference to FIGS. 1, 5 and 6, the casing 34 has an inlet 58 through which hydraulic fluid is pumped into the casing by the hydraulic pump 48. As illustrated in FIG. 1, there are actually two of the inlets 58 such that the pumping takes place in both directions of relative rotation between the rotary member embodied by the axle half shaft 28 and the casing 34. In this connection, each of the inlets 58 includes an associated check valve 60 for opening and closing inlet bores 62 of varying size along the direction of rotation. Each check valve 60 as shown in FIGS. 5 and 6 has a thin valve element 64 that is mounted by guides such as the threaded bolts 66 show for movement between the solid line indicated open position of FIG. 6 and the phantom line indicated- closed position. Upon one direction of relative rotation between the impeller 50 and the internal gear 54 shown in FIG. 2, one of the check valves 60 opens to permit the hydraulic fluid to be pumped from the housing 30 into the casing 34 while the other check valve 60 is then closed so that the hydraulic fluid is not pumped out of the casing through the other inlet port. During the opposite direction of relative rotation between the impeller 50 and the casing 34, the open and closed positions of the inlet ports 58 is reversed.

As best illustrated in FIGS. 7 and 9, an outlet port 78 is also provided and is located on the cap member 40 by the casing 34. A control valve 80 of the coupling closes the outlet port 78 as is hereinafter more fully described when the pumped fluid reaches a predetermined pressure which is proportional to the relative rotation between the pump impeller and ring gear and thus corresponds to the relative rotation between the right axle half shaft 26 connected through the differential 36 to the casing 34 and the left axle half shaft 28 that is connected to the impeller 50. As the pumped hydraulic fluid reaches the predetermined pressure, the valve 80 closes as is hereinafter more fully described to close the outlet port 78 and thus prevent the hydraulic fluid from being pumped from the hydraulic pump 48. This causes the hydraulic pump 48 to act as a brake by coupling the impeller 52 with the internal ring gear 54 and thereby also couples the rotary members embodied by the right and left axle half shafts 26 and 28 to each other.

As best illustrated in FIGS. 10 and 11, the valve 80 includes an elongated metallic strip valve element 82 having one portion or end 84 that is mounted in a spaced relationship to the outlet port 78 in any suitable manner such as by the headed bolts 86 illustrated. Valve element 82 also has a distal end 88 that is movable between a solid line indicated open position spaced from the outlet port 78 as shown in FIG. 10 and a phantom line indicated closed position that closes the outlet port. This valve element 82 is of the bimetallic type and thus includes two metals 90 and 92 that have different coefficients of thermal expansion so as to cause the valve element to move as its temperature is raised and lowered. More specifically, as the hydraulic fluid is heated such as during continued usage, the valve element end 88 moves toward the outlet port 78 with the net result being that the less viscous fluid will close the valve 80 at the same pressure of pumped fluid corresponding to the same amount of relative rotation between the axle half shafts. Furthermore, upon cooling of the hydraulic fluid such as after rest for a certain period of time, the valve element end 88 moves away from the outlet port 78 such that the valve closes at the same pressure of pumping of the more viscous hydraulic fluid. Thus, the bimetallic valve element 82 compensates for viscosity changes as the hydraulic fluid is heated and cooled to ensure that the coupling between the two rotary members embodied by the two axle half shafts takes place at the same rate of relative rotation. More specifically, the valve closing as discussed above causes the hydraulic pump 48 to then function as a brake that limits the relative rotation between the two rotary members embodied by the two axle half shafts and also causes the actuation of the clutch 68 to further couple the two axle half shafts to each other.

As best illustrated in FIGS. 10 and 11, the outlet port 78 preferably includes a main passage 94 that is closed by the valve element 82 as its end 88 moves from the open position to the closed position as previously described. Outlet port 78 also includes a bleed passage 96 that remains open even when the valve element 82 is closed with respect to the main passage 94 in order to provide a bleed flow of hydraulic fluid that cools the clutch 68 and also ensures that the temperature of the hydraulic fluid within the pump 48 does not excessively increase at a rapid rate. When the valve element 82 opens, the fluid flow through both passages of the outlet port 78 provides cleaning of the bleed passage 96 to remove any small particles that might block the smaller cross-sectional flow area of the bleed passage. The control valve 80 is thus self cleaning during normal usage. Also, the bleed passage 96 allows pressurized fluid to flow from the piston chamber 71 when the hydraulic pumping stops as the pair of rotary members cease to rotate relative to each other, and the clutch 68 is disengaged as the pressure in the piston chamber drops as is hereinafter more fully described. In this construction of the control valve 80, the bleed passage 96 is defined by the valve body provided by the piston 72 (FIG. 7) on which the valve element 82 is mounted.

As shown in FIGS. 7–11 and best illustrated in FIGS. 10 and 11, the coupling includes an elongated mounting recess 98 having one portion or end 100 at which the one end 84 of the valve element 82 is mounted and having another end 102 at which the main passage 94 and bleed passage 96 of the outlet port 78 are located. This recess in cooperation with the bimetallic valve element 82 provides a continually varying change in the cross-sectional flow area of flow to the outlet port 78 from the other side of the valve element such that movement of the valve element end 88 in response to temperature changes provides an accurate control of the pressure at which the valve element closes to initiate the operation of the hydraulic pump as a brake and the actuation of the clutch. For any given predetermined open position of the valve element 82, there is a certain pressure at which the hydraulic fluid of a certain velocity will cause closure of the valve element. This results from the flow of the hydraulic fluid between the valve element end 88 and the adjacent end of the recess 102 to the outlet port 78. This flow causes a pressure drop in the fluid upon passage past the valve element end 88 so that there is less force acting on the outlet side of the valve element end 88 than on the hydraulic pump side which are respectively the lower and upper sides as illustrated in FIG. 10. Movement of the valve element 82 to change the position of its end 88 in response to temperature changes varies the cross-sectional area of flow between this valve element end and the recess end 102 so as to thereby accurately compensate for temperature changes and ensure that the closure of the valve 80 corresponds to the same rate of relative rotation between the rotary members embodied by the axle half shafts 26 and 28 shown in FIG. 1.

As best illustrated in FIGS. 7–9, the valve element 82 moves radially with respect to the axis A and recess 98 is located within an elongated opening 103 that projects from the pump side of the piston 72 toward the clutch side of the piston. More specifically, the recess 98 is located within the opening 103 on the radial outward side thereof with respect to rotational axis A such that the distal valve element end 88 moves radially outward to the closed position and radially inwardly to the open position as well as moving radially outward and inward to adjust for temperature changes as previously described.

With reference to FIGS. 7–9, the hydraulic coupling is also illustrated as including a valve closure 104 that moves the valve element 82 to the closed position with respect to the outlet port 78 upon rotation of the coupling casing above a predetermined vehicle speed. This valve closure provides the immediate coupling between the rotary members embodied by the axle half shafts upon any relative rotation therebetween by operation of the hydraulic pump as a brake as well as immediate actuation of the clutch in the manner previously described. This valve closure 104 is preferably constructed to include a centrifugal weight 106 having a pivotal connection 108 that provides mounting thereof such as on the piston 72 in the embodiment illustrated. The valve closure 104 also includes an actuating portion 110 that extends from the centrifugal weight 106 and engages the valve element 82 to move the valve element to the closed position with respect to the outlet port 78 upon rotation of the coupling casing above the predetermined speed. More specifically, such rotation causes the centrifugal force of the weight 106 to overcome the resiliency of the valve element 82 and provide movement thereof from the open position to the closed position so that the braking action provided by the hydraulic pump and the clutch actuation are immediate upon any relative rotation between the rotary members embodied by the axle half shafts as previously described.

As previously mentioned, the hydraulic coupling 32 illustrated in FIG. 1 has the planetary gear set 36 which is of the bevel gear type connecting the casing 34 and the one rotary member embodied by the right axle half shaft 26. This planetary gear set includes a pair of side gears 124 and 126 which have respective spline connections 128 and 130 to the rotary members embodied by the axle half shafts 26 and 28. Planet gears 132 of the gear set 36 are each meshed with the pair of side gears 124 and 126 and are rotatably supported by a cross pin 134 that extends through the rotational axis A between opposite sides of the casing 34. The planetary gear set 36 provides a differential action between the rotary members embodied by the axle half shafts 26 and 28 until closure of the valve 80 causes the hydraulic pump 48 to function as a brake and also actuate the clutch 68 as previously described whereupon the axle half shaft 26 is coupled through the spline connections 128, side gear 124, planet gears 132, side gear 126 and the spline connections 130 with the other axle half shaft 28.

With reference to FIG. 1, the braking action provided by the hydraulic pump 48 provides the sole coupling between the impeller 50 and the ring gear 54 and thus also the sole coupling between the pair of rotary members embodied by the right and left axle half shafts 26 and 28. In this embodiment, the casing cap member 40 has a pair of inlets 58 located on opposite sides of the rotational axis A, with each being provided with an associated check valve 60 but only one being fully shown and the other illustrated by a single phantom line schematic representation. Furthermore, the casing cap member 40 also has a pair of the outlet ports 78 located on opposite sides of the rotational axis A with each being provided with a control valve 80 of the same construction previously discussed, but with only one outlet and associated control valve being shown by full line representation and the other merely shown by a single phantom line schematic representation. Such provision of the pair of inlet ports and associated check valves and the pair of outlet ports and associated control valves allows the braking action provided by the hydraulic pump 48 to operate in both directions of relative rotation between the rotary members embodied by the axle half shafts 26 and 28.

While the best mode for carrying out the invention have been described in detail, those familiar with the art to which this invention relates will recognize various alternatives, designs and embodiments for practicing the present invention as defined by the following claims.

What is claimed is:

1. A differential that is rotatively driven by a rotary drive member of a vehicle drivetrain and that rotatively drives a pair of rotary members of the drivetrain, the differential comprising:

a housing for containing hydraulic fluid;

a hydraulic coupling including a casing rotatively mounted within the housing and having a ring gear rotatively driven by the rotary drive member of the drivetrain;

a planetary gear set located within the casing and including a pair of bevel gears each of which has an associated spline connection to one of the pair of rotary members, the planetary gear set also having planet gears that revolve with the casing and are meshed with both bevel gears to provide a differential gear action therebetween;

the casing having a fluid inlet and an outlet port and also including a hydraulic pump having an impeller that includes external teeth and has a spline connection to one of the pair or rotary members, the hydraulic pump also having an internal ring gear mounted for rotation eccentrically with respect to the impeller and including internal teeth meshed with the external teeth of the impeller, the impeller having one less tooth than the ring gear to provide a rotational pumping of hydraulic fluid into the casing through the inlet thereof and outwardly through the outlet port upon relative rotation between the pair of rotary members; and a control valve that opens and closes the outlet port in response to the relative rotation between the pair of rotary members to control operation of the pump as a brake in coupling the pair of rotary members to each other.

* * * * *